(12) United States Patent
Mohaban et al.

(10) Patent No.: US 6,788,647 B1
(45) Date of Patent: Sep. 7, 2004

(54) AUTOMATICALLY APPLYING BI-DIRECTIONAL QUALITY OF SERVICE TREATMENT TO NETWORK DATA FLOWS

(75) Inventors: Shai Mohaban, Sunnyvale, CA (US); Itzhak Parnafes, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/443,947

(22) Filed: Nov. 19, 1999

(51) Int. Cl.[7] .............................................. H04L 12/56
(52) U.S. Cl. ..................................... 370/235; 370/389
(58) Field of Search ............................. 370/230, 230.1, 370/231, 238, 389, 392, 395.4, 395.42, 235, 236, 395.21, 395.32

(56) References Cited

U.S. PATENT DOCUMENTS

| | | | |
|---|---|---|---|
| 5,359,593 A | 10/1994 | Derby et al. | |
| 5,594,792 A | 1/1997 | Chouraki et al. | |
| 5,928,331 A | 7/1999 | Bushmitch | |
| 5,968,176 A | 10/1999 | Nessett et al. | |
| 5,970,064 A | 10/1999 | Clark et al. | 370/351 |
| 6,009,081 A | 12/1999 | Wheeler et al. | |
| 6,021,263 A | 2/2000 | Kujoory et al. | |
| 6,021,439 A | 2/2000 | Turek et al. | 709/224 |
| 6,028,842 A | 2/2000 | Chapman et al. | 370/235 |
| 6,046,980 A | 4/2000 | Packer | |
| 6,061,725 A | 5/2000 | Schwaller et al. | |
| 6,104,700 A | 8/2000 | Haddock et al. | 370/235 |
| 6,118,760 A * | 9/2000 | Zaumen et al. | |
| 6,154,776 A | 11/2000 | Martin | 709/226 |
| 6,167,445 A | 12/2000 | Gai et al. | |
| 6,169,748 B1 | 1/2001 | Barbas et al. | 370/468 |
| 6,212,184 B1 * | 4/2001 | Venkatachary et al. | |
| 6,286,052 B1 | 9/2001 | McCloghrie et al. | |
| 6,301,253 B1 | 10/2001 | Ichikawa | 370/395 |
| 6,301,613 B1 | 10/2001 | Ahlstrom et al. | 709/223 |
| 6,324,184 B1 | 11/2001 | Hou et al. | |
| 6,327,618 B1 | 12/2001 | Ahlstrom et al. | 709/223 |
| 6,363,429 B1 | 3/2002 | Ketcham | 709/235 |

(List continued on next page.)

OTHER PUBLICATIONS

S. Blake, et al., "An Architecture for Differentiated Services," Dec. 1998, pp. 1–36.

(List continued on next page.)

*Primary Examiner*—Chi Pham
*Assistant Examiner*—Kamran Emdadi
(74) *Attorney, Agent, or Firm*—Hickman Palermo Truong & Becker LLP

(57) ABSTRACT

A method and apparatus are provided for automatic reverse-direction or bi-directional quality of service treatment of network data flows. A network device located at the edge or border of a network, such as a router that is connected to another network, identifies a data flow originating within its network and directed outside the network, and having packets set with quality of service treatment values. Identified quality of service treatments may be IP precedence, DSCP marking of packets in the flow, an RSVP PATH message, etc. The network device creates and stores, in its local memory, values that uniquely identify the flow and that tell the device how to treat packets of the same flow that are transmitted in the opposite or inbound direction. Upon identifying a corresponding inbound flow with quality of service treatment, all packets of the flow are given a pre-configured quality of service treatment based upon the quality of service treatment of the originally identified flow.

43 Claims, 4 Drawing Sheets

U.S. PATENT DOCUMENTS

| | | |
|---|---|---|
| 6,393,473 B1 | 5/2002 | Chu |
| 6,401,240 B1 | 6/2002 | Summers |
| 6,424,659 B2 * | 7/2002 | Viswanadham |
| 6,430,154 B1 | 8/2002 | Hunt et al. |
| 6,442,151 B1 | 8/2002 | H'mimy et al. |
| 6,463,470 B1 | 10/2002 | Mohaban et al. |
| 6,466,984 B1 | 10/2002 | Naveh et al. |
| 6,473,793 B1 | 10/2002 | Dillion et al. |
| 6,483,805 B1 | 11/2002 | Davies et al. |
| 6,484,261 B1 | 11/2002 | Wiegel |
| 6,570,875 B1 * | 5/2003 | Hedge |
| 6,594,268 B1 * | 7/2003 | Aukia et al. |
| 6,601,082 B1 | 7/2003 | Durham et al. |
| 6,611,864 B2 | 8/2003 | Putzolu et al. |
| 6,621,793 B2 | 9/2003 | Widegren et al. |
| 6,622,170 B1 | 9/2003 | Harrison et al. |
| 6,651,191 B1 | 11/2003 | Vacante et al. |
| 6,671,724 B1 | 12/2003 | Pandya et al. |
| 6,684,244 B1 | 1/2004 | Goldman et al. |

OTHER PUBLICATIONS

D. Durham, et al., "The COPS (Common Open Policy Service) Protocol," Jan. 2000, pp. 1–38.

S. Herzog, et al., "COPS usage for RSVP," Jan. 2000, pp. 1–17.

Braden, Ed., et al., Standards Track, entitled "Resource ReSerVation Protocol (RSVP)—Version 1 Functional Specification", Sep. 1997, pp. 1–105.

* cited by examiner

AUTOMATICALLY APPLYING BI-DIRECTIONAL QUALITY OF SERVICE TREATMENT TO NETWORK DATA FLOWS

FIELD OF THE INVENTION

The present invention generally relates to data processing in a network communication system. The invention relates more specifically to methods and apparatus that provide automatic bi-directional quality of service treatment to network data flows.

BACKGROUND OF THE INVENTION

Network Communications

A computer network typically comprises a plurality of interconnected entities that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork knows as Internet.

Each network entity preferably includes network communication software, which may operate in accordance with Transport Control Protocol/Internet Protocol (TCP/IP). TCP/IP generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP which is a reliable, connection-oriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are reassembled and passed up the layers of the destination entity's communication stack. At each layer, the corresponding message headers are also stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at Layer 2 which, in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which in TCP/IP networks corresponds to the Internet Protocol (IP) layer. IP data packets include a corresponding header which contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

Allocation of Network Resources

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1p to the 802.1D bridge standard.

FIG. 1A is a partial block diagram of a Data Link frame 100 that includes a MAC destination address (DA) field 102, a MAC source address (SA) field 104 and a data field 106. According to the 802.1Q standard, a user_priority field 108, among others, is inserted after the MAC SA field 104. The user_priority field 108 may be loaded with a predetermined value (e.g., 0–7) that is associated with a particular treatment, such as background, best effort, excellent effort, etc. Network devices, upon examining the user_priority field 108 of received Data Link frames 100, apply the corresponding treatment to the frames. For example, an intermediate device may have a plurality of transmission priority queues per port, and may assign frames to different queues of a destination port on the basis of the frame's user priority value.

FIG. 1B is a partial block diagram of a Network Layer packet 120 corresponding to the Internet Protocol. Packet 120 includes a type_of_service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc., and comprises a number of sub-fields. The sub-fields may include a 3-bit IP precedence (IPP) field and three one-bit flags that signify Delay, Throughput, and Reliability. By setting the flags, a device may indicate whether delay, throughput, or reliability is most important for the traffic associated with the packet. Version 6 of the Internet Protocol (Ipv6) defines a traffic class field, which is also intended to be used for defining the type of service to be applied to the associated packet.

A working group of the Internet Engineering Task Force (IETF) has proposed replacing the ToS field 122 of Network Layer packets 120 with a one-octet differentiated services (DS) field 132 that can be loaded with a differentiated services codepoint (DSCP). Layer 3 devices that are DS compliant apply a particular per-hop forwarding behavior to data packets based on the contents of their DS fields 132. Examples of per-hop forwarding behaviors include expedited forwarding and assured forwarding. The DS field 132 is typically loaded by DS compliant intermediate devices located at the border of a DS domain, which is a set of DS compliant intermediate devices under common network administration. Thereafter, interior DS compliant devices along the path apply the corresponding forwarding behavior to the packet 120.

FIG. 1C is a partial block diagram of a Transport Layer packet 150 that preferably includes a source port field 152, a destination port field 154, and a data field 156, among others. Fields 152, 154 preferably are loaded with the TCP or UDP port numbers that are utilized by corresponding network entities.

Service Level Agreements

To interconnect dispersed computer networks, many organizations rely on the infrastructure and facilities of Internet Service Providers (ISPs). For example, an organization may lease one or more T1 lines to interconnect various LANs. Each organization enters into a service-level agreement with its ISP. The service level agreements include one or more traffic specifications. The traffic specifications may place limits on the amount of resources that the organization may consume for a given price.

For example, an organization may agree not to send traffic that exceeds a certain bandwidth, e.g., 1 Mb/s. Traffic entering the service provider's network is monitored to ensure that it complies with the relevant traffic specifications and is thus "in profile." Traffic that exceeds a traffic specification, and is therefore "out of profile," may be dropped or shaped or may cause an accounting change. Alternatively, the service provider may mark the traffic as exceeding the traffic specification, but allow it to proceed through the network anyway. If there is congestion, an intermediate network device may drop such marked traffic first in an effort to relieve the congestion.

Multiple Traffic Flows

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS") to each traffic flow. In particular, the network administrator may want a stock quote message to be given higher priority than a print transaction. Similarly, a $1 million stock transaction message for a premium client should be assigned higher priority than a $100 stock transaction message for a standard customer.

Deficiencies of Past Approaches

Quality of service signaling mechanisms, such as RSVP and DiffServ (or IP Precedence) can be used by network applications to signal the network and get specific treatment for specific flows. However, such mechanisms only permit one-directional quality of service signaling, from the sender to the receiver. This is inadequate for many applications.

Consider as an example, an Internet Service Provider (ISP) that is handling video conference traffic from a server at the ISP to a remote client. When a video conference connection is established between the ISP's equipment and the client, the ISP can set quality of service values for the outbound data flow that are appropriate to video conference traffic. However, processes for causing equipment in a remote network that contains the client to know that it is receiving video conference traffic, and for causing it to set quality of service values appropriately for traffic sent from the client to the server, are complex. These processes also do not scale well.

For example, if the client is connected through many edge network elements, then an appropriate QoS command must be configured on each and every edge network element. The classification of the flow may be dynamic so there is no way to preconfigure the edge devices to apply the right treatment to the other side's flow. Further, even if the classification is static (e.g., based on the IP address of the server), it may scale poorly. If there are many servers, one must potentially place a command for each and every server on potentially each and every edge device. This requires an unreasonable amount of work.

Further, applications may run on hosts that have no inherent capability of setting quality of service values. In a network with such hosts, quality of service signaling is carried out by a network device that serves as a proxy for quality of service. The proxy, for example, generates RSVP messages on behalf of the application, or marks its packets using a pre-installed Access Control List (ACL). In some cases, the receiving device is not under the same control as the sending device, or there is no proxy, or there may be many receiving devices. In all these cases, establishing signaling for a flow in the reverse direction is complicated.

For example, in a one-to-many configuration, such as a server with many clients, in one current approach, current approaches may require configuring multiple ACLs on multiple edge devices. Some approaches might require configuring many different ACLs on each and every switch; potentially one ACL for each server for quality of service is required. This requires extensive, duplicative configuration work.

Another context presenting problems for current approaches is an ISP network, for example, an ISP network that provides virtual private network services, in which a first peer node is within the network and a second peer node is outside the network. The ISP may mark traffic outbound from the first node, for example, by creating and storing an appropriate ACL on the switch or router that is adjacent to the first node. However, for each such node the ISP would have to install a similar ACL on all network devices at the border or edge of the network and going into other ISPs. Further, these ACLs might need to be added and removed dynamically as network flows are created and stopped.

Based on the foregoing, there is a clear need in this field for a way to set quality of service values for packets transmitted in the network flow in both directions of a flow among a sender and a receiver.

There is a specific need for an approach whereby QoS may be established for a flow at a single network edge device and automatically enforced by all other edge devices, without separate, manual configuration work occurring at all the edge devices. Current approaches do not permit automatic, bi-directional application of quality of service values to network data flows in this manner.

There is a specific need for a mechanism, useful for a data flow that is carrying a bi-directional or symmetrical video conference call, with which quality of service values may be set for devices used only in the outbound route of the data flow.

SUMMARY OF THE INVENTION

The foregoing needs, and other needs and objects that will become apparent from the following description, are fulfilled by the present invention, which comprises, in one embodiment, a method of providing automatic bi-directional quality of service treatment of a network data flow. A network device located at the edge or border of a network, such as a router that is connected to another network, identifies incoming data flows that have packets set with quality of service treatment values. The quality of service treatments recognized by the network device may be IP precedence, DSCP marking of packets in the flow, an RSVP PATH message, etc. Upon identifying an inbound flow with quality of service treatment, the network device creates and stores, in its local memory, values that uniquely identify the flow and that tell the device how to treat packets of the same flow that are transmitted in the opposite or outbound direction. All packets of the same flow, regardless of flow direction with respect to the network device, are given a pre-configured quality of service treatment.

In one aspect, the invention provides a method of automatically applying a quality of service treatment to a network data flow, comprising the steps of receiving a network data flow comprising at least one message element that is associated with an outbound quality of service treatment value; creating and storing an inbound quality of service value in association with information identifying the network data flow; receiving one or more inbound message elements; determining that the inbound message elements are associated with the same network data flow; and applying the inbound quality of service value to the inbound message elements based on the stored information.

According to one feature, receiving a network data flow comprises receiving a network data flow comprising at least one message element that is marked with a DSCP value and wherein applying the inbound quality of service value comprises marking the inbound message elements with the DSCP value. A related feature is that receiving a network data flow comprises receiving a network data flow comprising one or more message elements that are marked with a DSCP value, and wherein applying the inbound quality of service value comprises retrieving the inbound quality of service value from a mapping of DSCP values to associated quality of service values, and adding the retrieved quality of service value to the inbound message elements.

In another feature, the creating and storing step comprises creating and storing a hash entry in a hash table that uniquely identifies the network data flow and that includes the inbound quality of service value.

Still another feature is that applying the inbound quality of service value to the inbound message elements based on the stored information comprises automatically generating an inbound RSVP PATH message for the flow when the inbound message elements include an RSVP PATH message. Yet another feature is that receiving a network data flow comprises receiving a network data flow comprising at least one message element that includes an RSVP PATH message, and applying the inbound quality of service value comprises marking the inbound message elements with an RSVP PATH message.

Other features and aspects will become apparent from the following description and claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

General Overview

A method and apparatus providing automatic bi-directional quality of service treatment of network data flows is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In one embodiment, a network device located at the edge or border of a network, such as a router that is connected to another network, identifies data flows coming from within its network that have packets set with quality of service treatment values. The quality of service treatments recognized by the network device may be IP precedence, DSCP marking of packets in the flow, an RSVP PATH message, etc. Upon identifying an outbound flow with quality of service treatment, the network device creates and stores, in its local memory, a set of data values that uniquely identify the flow and that tell the device how to treat packets of the same flow that are transmitted back into the network. All packets of the same flow, regardless of flow direction with respect to the network device, automatically are given a pre-configured quality of service treatment. The stored data values may comprise any information sufficient to uniquely identify a flow, e.g., values indicating source IP address, destination IP address, source port, destination port, and protocol. The quality of service treatment that is automatically applied may be the same as that first identified, or may be a function of that treatment.

System Structure

Figure 1A:
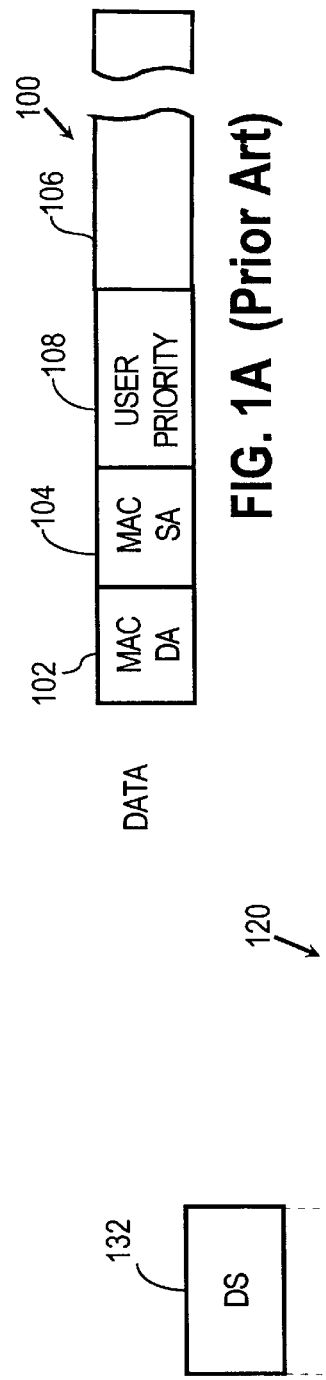
FIG. 1A is a partial block diagram of a Data Link frame.
Figure 1B:
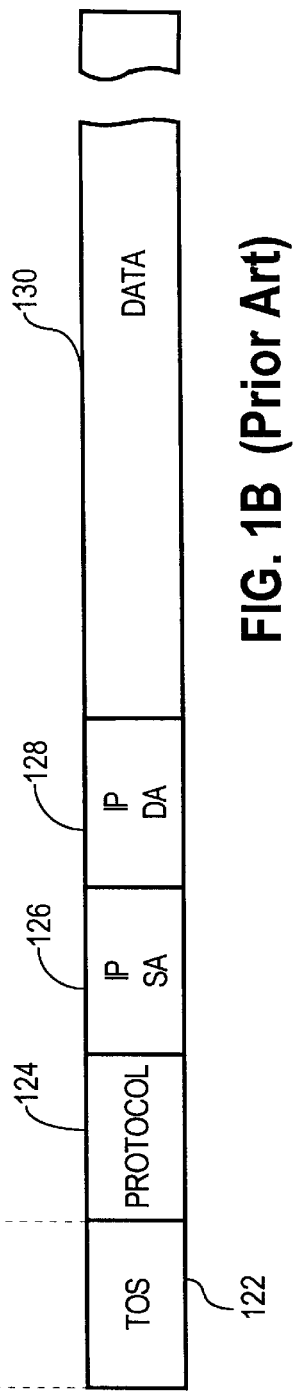
FIG. 1B is a partial block diagram of a Network Layer packet.
Figure 1C:
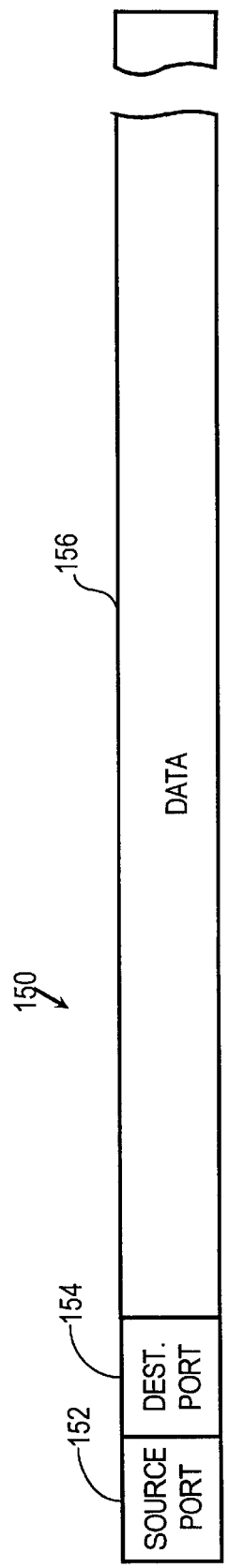
FIG. 1C is a partial block diagram of a Transport Layer packet.
Figure 2:
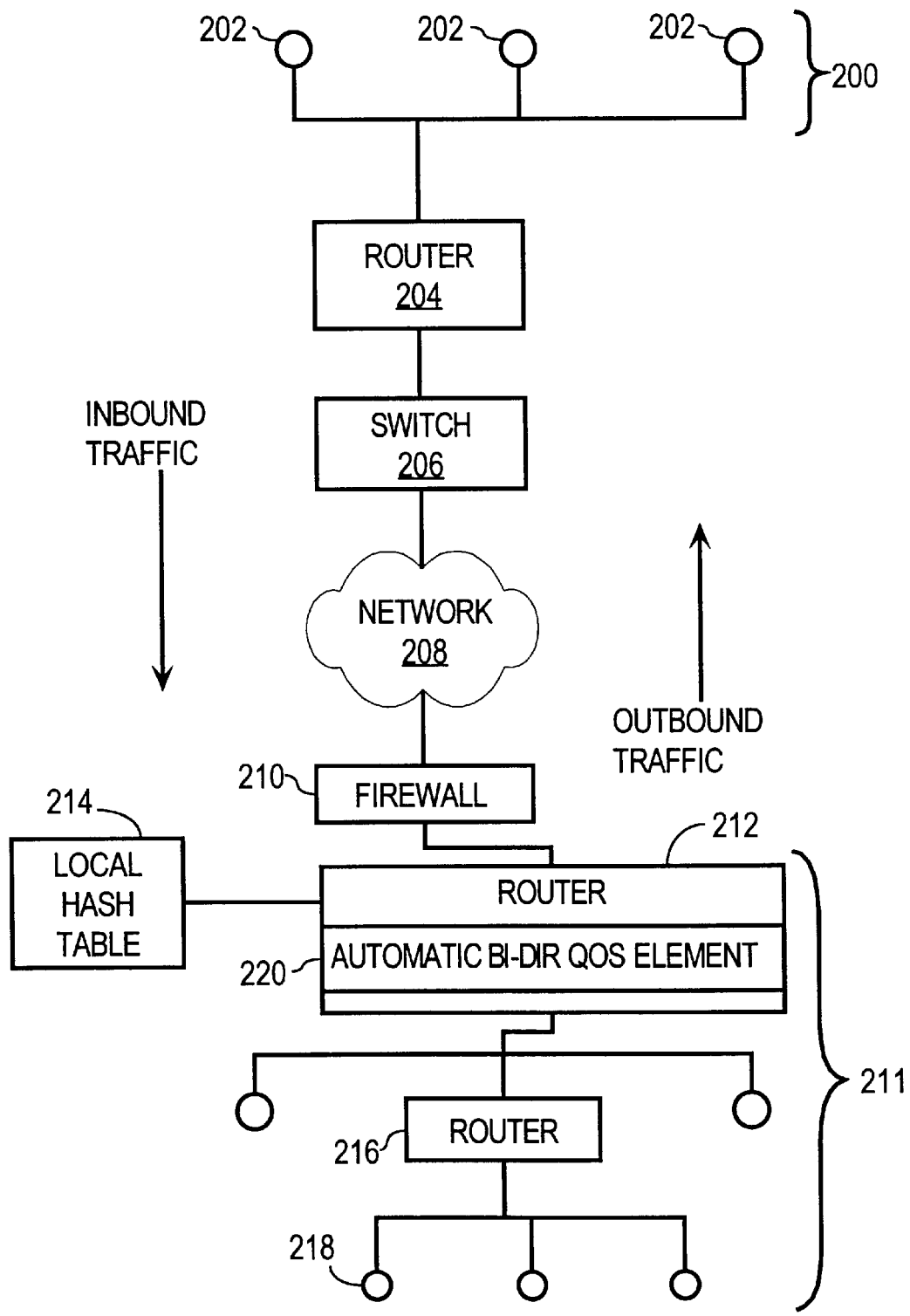
FIG. 2 is a block diagram of a network system configured for automatic bi-directional quality of service treatment of network data flows.

FIG. 2 is a block diagram of a communications system. A local area network 200 comprises network end stations 202 that are coupled to the network 200 and to router 204. Each network end station 202 is an end station or terminal device such as a workstation, personal computer, printer, etc. Router 204, in one preferred embodiment, is a router of the type used in packet-switched data networks. For example, any router in the model 2600 series, commercially available from Cisco Systems, Inc., San Jose, Calif., may be used as router 204. Switch 206 connects router 204 to network 208, which is another local area network, a wide area network, or the global, packet-switched internetwork known as the Internet.

The configuration of network 200 is shown only as a representative example of the kind of network that can be used in an embodiment. Any number of routers, end stations, and switches may be used in other suitable networks.

For purposes of illustrating an exemplary embodiment, in this configuration, network 200 functions as a sending network. Thus, one of the network end stations 202 initiates a network data flow, comprising a stream of message elements, directed toward another end station elsewhere in the network. The stream of message elements may comprise, in a preferred embodiment, packetized data, for example, a transmission over a TCP/IP connection to a remotely located server.

Network 208 is further coupled to a receiving network 211. In one embodiment, which is illustrated as an example, network 211 comprises firewall 210, which is coupled to a network device 212 that is coupled to an automatic quality of service treatment element 220 and a local hash table 214. Router 216 is coupled to other end stations 218 within network 211. In this configuration, end stations 202 may send information through the networks to end stations 218. The information is sent in the form of individually switched message elements such as packets.

In a preferred embodiment, the network device 212 is a router, switch, or gateway that is located at the edge or border of a network. For example, network device 212 may be a router that is connected to another network, as in FIG. 2, or a switch that is connected directly to servers, etc.

Automatic quality of service treatment element 220 may be implemented in the form of one or more computer software elements, programs, processes or instructions that provide automatic reverse-direction or bi-directional quality of service treatment of network data flows. In a preferred embodiment, automatic quality of service treatment element 220 comprises program instructions that are integrated into a network operating system that is executed by network device 212. An example of a suitable network operating system is Internetworking Operating System (IOS) release 12, commercially available from Cisco Systems.

Network device 212 may be, for example, a router or a switch of the type used in packet-switched data networks. Preferably, network device 212 is located at the edge or border of a network, such as a router that is connected to another network, a switch that is connected directly to servers, etc., as seen in FIG. 2.

In operation, network device identifies incoming flows that have quality of service treatment. The quality of service treatment recognized by the network device may be IP precedence, DSCP marking of packets in the flow, an RSVP PATH message, etc. A packet may be identified as belonging to the same flow by examining values of its source IP address, destination IP address, source port number, destination port number, and protocol.

Upon identifying a flow with quality of service treatment, the network device creates and stores a value that tells the device how to treat packets of the same flow that are transmitted in the opposite direction. All packets of the same flow are given a predetermined quality of service treatment. The specific treatment that is applied may be the same. Alternatively, the specific treatment applied in the opposite direction is a function of what is applied in the original direction. For example, in the case of RSVP, the reservation used in the opposite direction may be different; this could occur, e.g., when each side of a voice conversation uses a different kind of CODEC device.

The stored information may be a hash table entry, or an entry in an access control list.

For example, an RSVP PATH message will be generated for the opposite flow. In the case of RSVP the decision may be made to either generate a reservation request (a PATH message) on the opposite direction, that is, with the same network resources request, or use other mechanisms such as DiffServ. When the inbound flow uses DiffServ or IP Precedence, network device 212 may install policy information on itself that tells itself what DSCP value to assign for the opposite flow. Generally the DSCP value assigned for the opposite flow is identical to the original value, thus putting the opposite flow into the same service class.

Method of Operation

Figure 3:
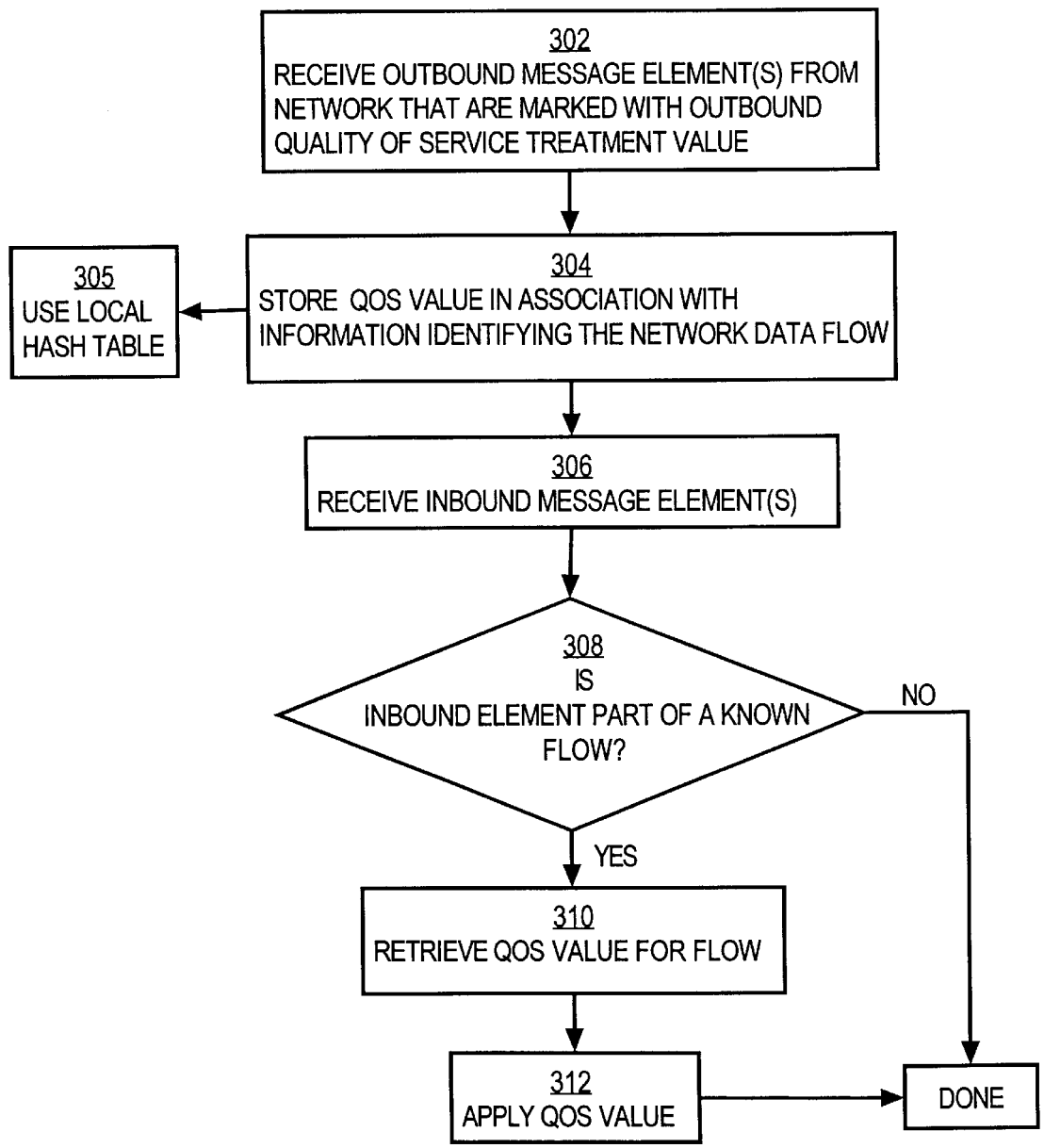
FIG. 3 is a block diagram of a flow diagram of an exemplary embodiment of a method of automatic bi-directional quality of service treatment of network data flows.

FIG. 3 is a flow diagram of a method of applying bi-directional quality of service treatment to network data flows. For purposes of illustrating one exemplary embodiment, the steps of FIG. 3 indicate steps that could be carried out by a device in the position of router 212 that has automatic bi-directional quality of service element 220.

In block 302, inbound message elements that are marked with an inbound quality of service value are received. For example, a router configured to execute the process of FIG. 3 receives inbound packets that are marked with DSCP values or associated with an RSVP PATH message. Block 302 may involve both determining that a quality of service value is associated with the inbound packets and determining what specific type of quality of service value is associated with the packets. The quality of service treatment recognized by the network device may be IP precedence, DSCP marking of packets in the flow, an RSVP PATH message, etc. A packet may be identified as belonging to the same flow by examining values of its source IP address, destination IP address, source port number, destination port number, and protocol.

In block 304, the process stores a quality of service value in association with information identifying the network data flow. As indicated by block 305, the steps of block 304 may involve using a local hash table to store the information. Each hash table entry comprises a combination of information identifying the network flow (such as, in the TCP/IP context, source and destination IP address values and source and destination port values), and information identifying what quality of service value to apply. Alternatively, the stored information may be an entry in an access control list.

In block 306, outbound message elements are received. Block 306 may involve receiving data packets from one of the clients 218 at router 212 that are associated with a flow directed from receiving network 211 to sending network 200.

In block 308, the process tests whether the outbound message elements are part of a known flow. Block 308 may involve obtaining information identifying the current flow that contains the message elements and looking it up in the hash table or the access control list. In the case of RSVP, such a lookup is not necessarily needed; the opposite PATH message can be generated as soon as the incoming PATH message arrives. In this case, the flows are then treated using the regular RSVP enforcement scheduling and queuing mechanisms of the router, so the process need not examine each packet. If a lookup is carried out and the information is found, then the outbound message elements are part of a known flow. If so, then control passes to block 310, in which the process retrieves a quality of service value for the current flow. Further, the process applies the quality of service value to the message elements of the current flow. If an outbound element is not part of a known flow, then no further processing is done. In the case of RSVP, a reverse PATH message can be issued without waiting, as soon as the original PATH message is received. Thus, reverse direction packets are simply forwarded and a reservation for them will have been installed and the packets will receive the preferred service.

Hardware Overview

Figure 4:
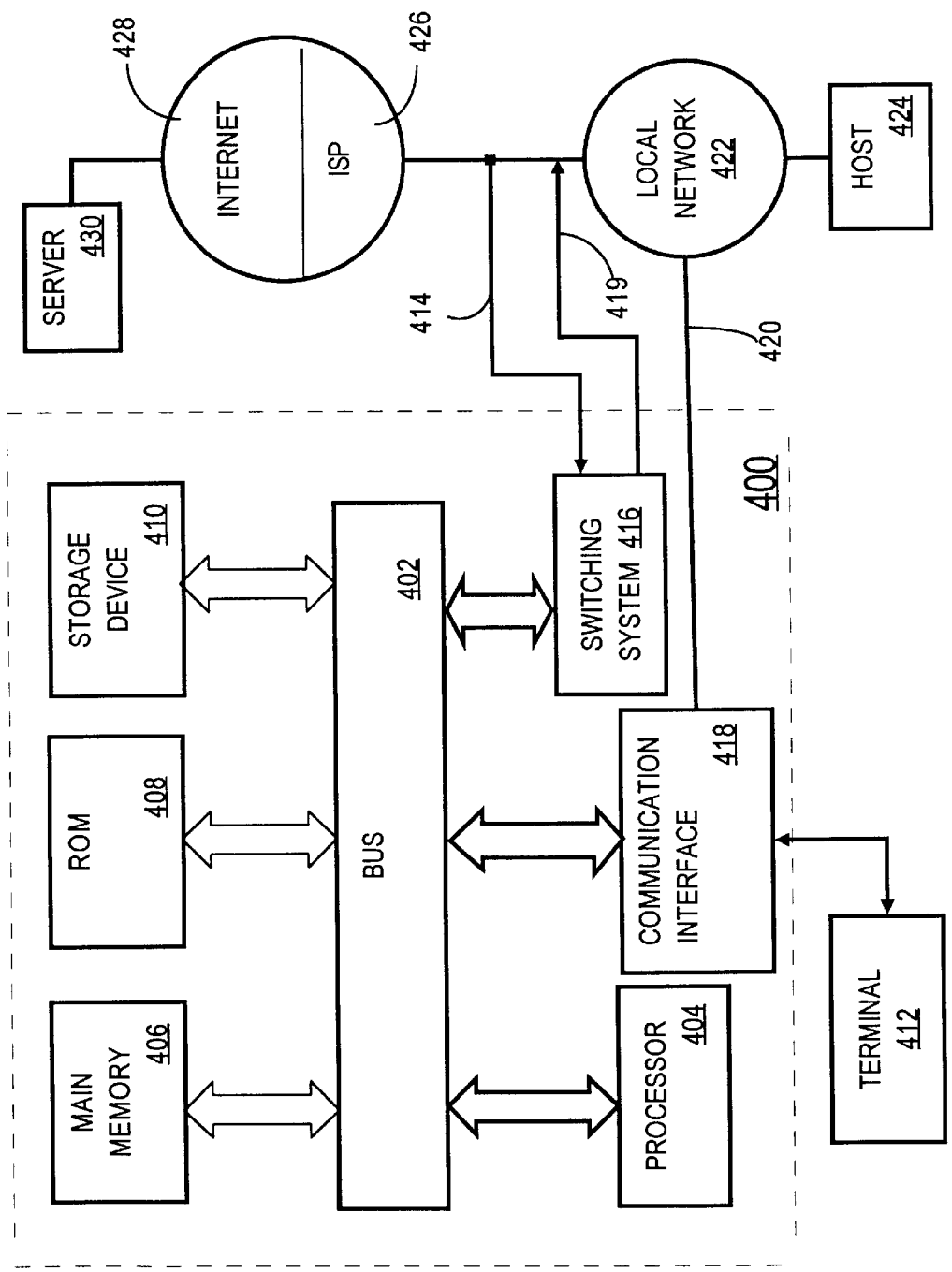
FIG. 4 is a block diagram of a computer system with which an embodiment may be used.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. In one embodiment, interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for the techniques and functions described herein in a network system. According to one embodiment of the invention, such techniques and functions are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the techniques and functions that are described herein.

The received code may be executed by processor 404 as it is received, and/or stored in storage device 410, or other non-volatile storage for later execution. In this manner, computer system 400 may obtain application code in the form of a carrier wave.

Applications and Advantages

Using the foregoing mechanism, network devices, such as switches and routers, can automatically enable quality of service for the flows in the opposite direction based on the service granted for the original flow for which quality of service was signaled.

Exemplary applications include video conferencing, other bi-directional video applications, Internet Protocol telephony, and client-server applications in which the links from the clients to the server are also congested and require prioritization. In any of these applications and others, a network administrator may rapidly and easily provide bi-directional quality of service. Devices in the network can be configured to automatically provide quality of service for the opposite direction of a flow so that the network administrator need only classify the traffic from one of the endpoints.

The techniques disclosed in this document are very useful in a one-to-many configuration, for example, a server with many clients. The packets may be marked on the switch near the servers, and then all switches near the clients are configured to simply mark the opposite flows with the same DiffServ value. Current solutions might require configuring many different ACLs on each and every switch; potentially at least one ACL for each server for quality of service is required.

Another context is an ISP network, for example, an ISP network that provides virtual private network services, in which a first peer node is within the network and a second peer node is outside the network. The ISP may mark traffic from the first node, for example, by creating and storing an appropriate ACL on the switch or router that is adjacent to the first node. However, for each such node the ISP would have to install a similar ACL on all network devices at the border or edge of the network and going into other ISPs. Further, these ACLs might need to be added and removed dynamically as network flows are created and stopped.

Advantageously, an embodiment permits the ISP to configure its border routers to mark each flow going through them with the same DSCP on the opposite direction. The network administrator then needs to ensure only that traffic is marked correctly within his network.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of automatically applying a quality of service treatment to a bidirectional network data flow, comprising the steps of:

receiving at a first device the bidirectional network data flow comprising at least one outbound message element that is associated with an outbound quality of service treatment value, wherein the first device is one of one or more devices;

creating and storing in a computer-readable medium an inbound quality of service value in association with information identifying the bidirectional network data flow wherein the inbound quality of service value is derived from the outbound quality of service treatment value;

receiving one or more inbound message elements at a second device, wherein the second device is one of the one or more devices and the second device is distinct from the first device;

determining that the inbound message elements are associated with the same bidirectional network data flow;

accessing, from the second device, the computer-readable medium containing the inbound quality of service value; and applying the inbound quality of service value to the one or more inbound message elements based on the stored information.

2. A method as recited in claim 1, wherein receiving a bidirectional network data flow comprises receiving a bidirectional network data flow comprising at least one outbound message element that is marked with a DSCP value and wherein applying the inbound quality of service value comprises marking the inbound message elements with the DSCP value.

3. A method as recited in claim 1, wherein receiving a bidirectional network data flow comprises receiving a bidirectional network data flow comprising one or more outbound message elements that are marked with a DSCP value, and wherein applying the inbound quality of service value comprises retrieving the inbound quality of service value from a mapping of DSCP values to associated quality of service values, and adding the retrieved quality of service value to the inbound message elements.

4. A method as recited in claim 1, wherein the creating and storing step comprises creating and storing a hash entry in a hash table that uniquely identifies the bidirectional network data flow and that includes the inbound quality of service value.

5. A method as recited in claim 1, wherein applying the inbound quality of service value to the inbound message elements based on the stored information comprises automatically generating an inbound RSVP PATH message for the flow when the inbound message elements include an RSVP PATH message.

6. A method as recited in claim 1, wherein receiving a bidirectional network data flow comprises receiving a bidirectional network data flow comprising at least one outbound message element that includes a first RSVP PATH message and wherein applying the inbound quality of service value comprises marking the inbound message elements with a second RSVP PATH message, wherein the second RSVP PATH message is created based on the first RSVP PATH message.

7. A router apparatus capable of routing packets of data flows in a packet-switched communications network and automatically applying quality of service treatments to the data flows, comprising:
   a memory configured to store information identifying the data flows and an inbound quality service value associated with each of the data flows;
   a stored program that can access the information in the memory and which, when executed by the router apparatus, carries out the steps of:
      receiving at a first device a bidirectional network data flow comprising at least one outbound message element that is associated with an outbound quality of service treatment value, wherein the first device is one of one or more devices;
      creating and storing in a computer-readable medium an inbound quality of service value in association with information identifying the bidirectional network data flow wherein the inbound quality of service value is derived from the outbound quality of service treatment value;
      receiving one or more inbound message elements at a second device, wherein the second device is one of the one or more devices and the second device is distinct from the first device;
      determining that the inbound message elements are associated with the same bidirectional network data flow;
      accessing, from the second device, the computer-readable medium containing the inbound quality of service value; and
      applying the inbound quality of service value to the one or more inbound message elements based on the stored information.

8. A router apparatus as recited in claim 7, wherein the stored program step of receiving a bidirectional network data flow comprises receiving a bidirectional network data flow comprising at least one outbound message element that is marked with a DSCP value and wherein applying the inbound quality of service value comprises marking the inbound message elements with the DSCP value.

9. A router apparatus as recited in claim 7, wherein the stored program step of receiving a bidirectional network data flow comprises receiving a bidirectional network data flow comprising one or more outbound message elements that are marked with a DSCP value, and wherein applying the inbound quality of service value comprises retrieving the inbound quality of service value from a mapping of DSCP values to associated quality of service values, and adding the retrieved quality of service value to the inbound message elements.

10. A router apparatus as recited in claim 7, wherein the creating and storing step comprises creating and storing a hash entry in a hash table that uniquely identifies the bidirectional network data flow and that includes the inbound quality of service value.

11. A router apparatus as recited in claim 7, wherein receiving a bidirectional network data flow comprises receiving a bidirectional network data flow comprising at least one outbound message element that includes a first RSVP PATH message and wherein applying the inbound quality of service value comprises marking the inbound message elements with a second RSVP PATH message, wherein the second RSVP PATH message is created based on the first RSVP PATH message.

12. A switch apparatus capable of switching packets of data flows in a packet-switched communications network and automatically applying quality of service treatments to the data flows, comprising:
   a memory configured to store information identifying the data flows and an inbound quality service value associated with each of the data flows;
   a stored program that can access the information in the memory and which, when executed by the switch apparatus, carries out the steps of:
      receiving at a first device a bidirectional network data flow comprising at least one outbound message element that is associated with an outbound quality of service treatment value, wherein the first device is one of one or more devices;
      creating and storing in a computer-readable medium an inbound quality of service value in association with information identifying the bidirectional network data flow wherein the inbound quality of service value is derived from the outbound quality of service treatment value;
      receiving one or more inbound message elements at a second device, wherein the second device is one of the one or more devices and the second device is distinct from the first device;
      determining that the inbound message elements are associated with the same bidirectional network data flow;
      accessing, from the second device, the computer-readable medium containing the inbound quality of service value; and
      applying the inbound quality of service value to the one or more inbound message elements based on the stored information.

13. A switch apparatus as recited in claim 12, wherein the stored program step of receiving a bidirectional network data flow comprises receiving a bidirectional network data flow comprising at least one outbound message element that is marked with a DSCP value and wherein applying the inbound quality of service value comprises marking the inbound message elements with the DSCP value.

14. A switch apparatus as recited in claim 12, wherein the stored program step of receiving a bidirectional network data flow comprises receiving a bidirectional network data flow comprising one or more outbound message elements that are marked with a DSCP value, and wherein applying the inbound quality of service value comprises retrieving the inbound quality of service value from a mapping of DSCP values to associated quality of service values, and adding the retrieved quality of service value to the inbound message elements.

15. A switch apparatus as recited in claim 12, wherein the creating and storing step comprises creating and storing a hash entry in a hash table that uniquely identifies the bidirectional network data flow and that includes the inbound quality of service value.

16. A switch apparatus as recited in claim 12, wherein receiving a bidirectional network data flow comprises receiving a bidirectional network data flow comprising at least one outbound message element that includes a first RSVP PATH message and wherein applying the inbound quality of service value comprises marking the inbound message elements with a second RSVP PATH message, wherein the second RSVP PATH message is created based on the first RSVP path message.

17. A computer-readable medium carrying one or more sequences of instructions for automatically applying quality of service treatments to data flows in a communications network, wherein execution of the one or more sequences of instructions by one or more processors causes the one or more processors to perform the steps of:
  receiving at a first device a bidirectional network data flow comprising at least one outbound message element that is associated with an outbound quality of service treatment value, wherein the first device is one of one or more devices;
  creating and storing in a computer-readable medium an inbound quality of service value in association with information identifying the bidirectional network data flow wherein the inbound quality of service value is derived from the outbound quality of service treatment value;
  receiving one or more inbound message elements at a second device, wherein the second device is one of the one or more devices and the second device is distinct from the first device;
  determining that the inbound message elements are associated with the same bidirectional network data flow;
  accessing, from the second device, the computer-readable medium containing the inbound quality of service value; and
  applying the inbound quality of service value to the one or more inbound message elements based on the stored information.

18. The computer readable medium of claim 17, wherein receiving a bidirectional network data flow comprises receiving a bidirectional network data flow comprising at least one outbound message element that is marked with a DSCP value and wherein applying the inbound quality of service value comprises marking the inbound message elements with the DSCP value.

19. The computer readable medium of claim 17, wherein receiving a bidirectional network data flow comprises receiving a bidirectional network data flow comprising one or more outbound message elements that are marked with a DSCP value, and wherein applying the inbound quality of service value comprises retrieving the inbound quality of service value from a mapping of DSCP values to associated quality of service values, and adding the retrieved quality of service value to the inbound message elements.

20. The computer readable medium of claim 17, wherein the creating and storing step comprises creating and storing a hash entry in a hash table that uniquely identifies the bidirectional network data flow and that includes the inbound quality of service value.

21. The computer readable medium of claim 17, wherein applying the inbound quality of service value to the inbound message elements based on the stored information comprises automatically generating an inbound RSVP PATH message for the flow when the inbound message elements include an RSVP PATH message.

22. The computer readable medium of claim 17, wherein receiving a bidirectional network data flow comprises receiving a bidirectional network data flow comprising at least one outbound message element that includes a first RSVP PATH message and wherein applying the inbound quality of service value comprises marking the inbound message elements with a second RSVP PATH message, wherein the second RSVP PATH message is created based on the first RSVP PATH message.

23. A data communications network, comprising:
  a first end station that communicates with other end stations in the network using packetized message elements;
  a first router coupled to the first end station and capable of routing the message elements among the first end station and the other end stations and automatically applying quality of service treatments to data flows, and comprising a memory configured to store information identifying the data flows and an inbound quality service value associated with each of the data flows, and a stored program that can access the information in the memory and which, when executed by the first router, carries out the steps of:
    receiving at the first router a bidirectional network data flow comprising at least one outbound message element that is associated with an outbound quality of service treatment value; and
    creating and storing in a computer-readable medium an inbound quality of service value in association with information identifying the bidirectional network data flow wherein the inbound quality of service value is derived from the outbound quality of service treatment value;
  a second router coupled to the first end station and capable of routing the message elements among the first end station and the other end stations and automatically applying quality of service treatments to the data flows, and comprising a second memory configured to store information identifying the data flows and an inbound quality service value associated with each of the data flows, and a second stored program that can access the information in the second memory and which, when executed by the second router, carries out the steps of:
    receiving one or more inbound message elements;
    determining that the inbound message elements are associated with the same bidirectional network data flow;
    accessing the computer-readable medium containing the inbound quality of service value; and
    applying the inbound quality of service value to the one or more inbound message elements based on the stored information.

24. A method of automatically applying a quality of service treatment to a bidirectional network data flow in a packet-switched communications network, comprising the steps of:
  creating and storing a hash entry in a hash table stored in a computer-readable medium communicatively coupled to a first device that uniquely identifies an inbound quality of service value in association with information identifying a bidirectional network data flow based on an outbound quality of service value that is in at least one outbound message element that is associated with the outbound quality of service treatment value;

receiving one or more inbound message elements at a second device, wherein the second device is one of the one or more devices and the second device is distinct from the first device;

determining that the inbound message elements are associated with the same bidirectional network data flow;

accessing, from the second device, the computer-readable medium containing the inbound quality of service value; and applying the inbound quality of service value to the one or more inbound message elements based on the stored information.

25. A method as recited in claim 24, wherein the bidirectional network data flow comprises at least one outbound message element that is marked with a DSCP value and wherein applying the inbound quality of service value comprises marking the inbound message elements with the DSCP value.

26. A method as recited in claim 24, wherein the bidirectional network data flow comprises one or more outbound message elements that are marked with a DSCP value, and wherein applying the inbound quality of service value comprises retrieving the inbound quality of service value from a mapping of DSCP values to associated quality of service values, and adding the retrieved quality of service value to the inbound message elements.

27. A method as recited in claim 24, wherein receiving a bidirectional network data flow comprises receiving a bidirectional network data flow comprising at least one outbound message element that includes a first RSVP PATH message and wherein applying the inbound quality of service value comprises marking the inbound message elements with a second RSVP PATH message, wherein the second RSVP PATH message is created based on the first RSVP PATH message.

28. An apparatus for automatically applying a quality of service treatment to a bidirectional network data flow, comprising:

means for receiving at a first device a bidirectional network data flow comprising at least one outbound message element that is associated with an outbound quality of service treatment value, wherein the first device is one of one or more devices;

means for creating and storing in a computer-readable medium an inbound quality of service value in association with information identifying the bidirectional network data flow wherein the inbound quality of service value is derived from the outbound quality of service treatment value;

means for receiving one or more inbound message elements at a second device, wherein the second device is one of the one or more devices and the second device is distinct from the first device;

means for determining that the inbound message elements are associated with the same bidirectional network data flow;

means for accessing, from the second device, the computer-readable medium containing the inbound quality of service value; and means for applying the inbound quality of service value to the one or more inbound message elements based on the stored information.

29. The apparatus of claim 28, wherein receiving a bidirectional network data flow comprises receiving a bidirectional network data flow comprising at least one outbound message element that is marked with a DSCP value and wherein applying the inbound quality of service value comprises marking the inbound message elements with the DSCP value.

30. The apparatus of claim 28, wherein receiving a bidirectional network data flow comprises receiving a bidirectional network data flow comprising one or more outbound message elements that are marked with a DSCP value, and wherein applying the inbound quality of service value comprises retrieving the inbound quality of service value from a mapping of DSCP values to associated quality of service values, and adding the retrieved quality of service value to the inbound message elements.

31. The apparatus of claim 28, wherein the creating and storing step comprises creating and storing a hash entry in a hash table that uniquely identifies the bidirectional network data flow and that includes the inbound quality of service value.

32. The apparatus of claim 28, wherein applying the inbound quality of service value to the inbound message elements based on the stored information comprises automatically generating an inbound RSVP PATH message for the flow when the inbound message elements include an RSVP PATH message.

33. The apparatus of claim 28, wherein receiving a bidirectional network data flow comprises receiving a bidirectional network data flow comprising at least one outbound message element that includes a first RSVP PATH message and wherein applying the inbound quality of service value comprises marking the inbound message elements with a second RSVP PATH message, wherein the second RSVP PATH message is created based on the first RSVP PATH message.

34. A method of automatically applying a quality of service treatment to a bidirectional network data flow, comprising the steps of:

receiving at a first device the bidirectional network data flow comprising at least one outbound message element that is associated with a particular quality of service treatment value, wherein the first device is one of one or more devices;

creating and storing in a computer-readable medium the particular quality of service value in association with information identifying the bidirectional network data flow wherein the particular quality of service value is derived from the quality of service treatment value associated with the outbound message element;

receiving a request for a quality of service value for an inbound message element from a second device of one or more devices, wherein the inbound message element is associated with the particular bidirectional message flow, wherein the second device is distinct from the first device; and providing the particular quality of service value to the second device.

35. The method of claim 34, wherein receiving a bidirectional network data flow comprises receiving a bidirectional network data flow comprising at least one outbound message element that is marked with a DSCP value and wherein providing the particular quality of service value comprises providing the DSCP value.

36. The method of claim 34, wherein receiving a bidirectional network data flow comprises receiving a bidirectional network data flow comprising one or more outbound message elements that are marked with a DSCP value, and wherein providing the particular quality of service value comprises retrieving the particular quality of service value from a mapping of DSCP values to associated quality of service values, and providing the retrieved quality of service value to the second device.

37. The method of claim 34, wherein the creating and storing step comprises creating and storing a hash entry in a hash table that uniquely identifies the bidirectional network data flow and that includes the inbound quality of service value.

38. The method of claim 34, wherein receiving a bidirectional network data flow comprises receiving a bidirectional network data flow comprising at least one outbound message element that includes a first RSVP PATH message and wherein providing the particular quality of service value comprises providing a second RSVP PATH message, wherein the second RSVP PATH message is created based on the first RSVP PATH message.

39. A method of automatically applying a quality of service treatment to a bidirectional network data flow, comprising the steps of:

receiving one or more inbound message elements at a first device, wherein the first device is one of the one or more devices, the inbound message element is part of a bidirectional network data flow, no outbound message elements have been received at the first device, and no quality of service value is specified in the one or more inbound message elements;

accessing a computer-readable medium containing a particular quality of service value associated with the bidirectional network data flow, wherein the quality of service value was stored in the computer-readable medium by a second device based on an outbound message element associated with the bidirectional network data flow and the first device is distinct from the second device;

determining that the inbound message elements are associated with the same bidirectional network data flow; and applying the particular quality of service value to the one or more inbound message elements.

40. The method of claim 39, wherein one or more outbound message elements of the outbound message elements are marked with a DSCP value and wherein applying the particular quality of service value comprises marking the inbound message elements with the DSCP value.

41. The method of claim 39, wherein one or more outbound message elements of the outbound message elements are marked with a DSCP value, and wherein applying the particular quality of service value comprises retrieving the particular quality of service value from a mapping of DSCP values to associated quality of service values, and adding the retrieved quality of service value to the inbound message elements.

42. The method of claim 39, wherein applying the particular quality of service value to the inbound message elements based on the stored information comprises automatically generating an inbound RSVP PATH message for the flow when the inbound message elements include an RSVP PATH message.

43. The method of claim 39, wherein one or more outbound message elements of the one outbound message elements include a first RSVP PATH message and wherein applying the particular quality of service value comprises marking the inbound message elements with a second RSVP PATH message.

* * * * *

UNITED STATES PATENT AND TRADEMARK OFFICE
CERTIFICATE OF CORRECTION

PATENT NO. : 6,788,647 B1
DATED : September 7, 2004
INVENTOR(S) : Mohaban et al.

It is certified that error appears in the above-identified patent and that said Letters Patent is hereby corrected as shown below:

Column 15,
Line 19, "RSVP path" should read -- RSVP PATH --.

Signed and Sealed this

Thirtieth Day of November, 2004

JON W. DUDAS
*Director of the United States Patent and Trademark Office*